US011010266B1

(12) United States Patent
Blaszka et al.

(10) Patent No.: US 11,010,266 B1
(45) Date of Patent: May 18, 2021

(54) DUAL ISOLATION RECOVERY FOR PRIMARY-SECONDARY SERVER ARCHITECTURES

(71) Applicant: Amazon Technologies, Inc., Seattle, WA (US)

(72) Inventors: Avram Israel Blaszka, Seattle, WA (US); Jianhua Fan, Issaquah, WA (US); Danny Wei, Seattle, WA (US); Marc Stephen Olson, Bellevue, WA (US); Pieter Kristian Brouwer, Bellevue, WA (US); Shweta Joshi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 16/210,428

(22) Filed: Dec. 5, 2018

(51) Int. Cl.
| | |
|---|---|
| *G06F 16/00* | (2019.01) |
| *G06F 11/20* | (2006.01) |
| *G06F 3/06* | (2006.01) |
| *G06F 11/34* | (2006.01) |
| *G06F 16/182* | (2019.01) |

(52) U.S. Cl.
CPC .......... *G06F 11/2082* (2013.01); *G06F 3/065* (2013.01); *G06F 3/067* (2013.01); *G06F 3/0617* (2013.01); *G06F 3/0622* (2013.01); *G06F 3/0637* (2013.01); *G06F 3/0659* (2013.01); *G06F 11/2025* (2013.01); *G06F 11/2069* (2013.01); *G06F 11/3409* (2013.01); *G06F 16/184* (2019.01)

(58) Field of Classification Search
None
See application file for complete search history.

(56) References Cited

U.S. PATENT DOCUMENTS

| | | | | |
|---|---|---|---|---|
| 6,587,970 | B1 * | 7/2003 | Wang | G06F 11/2025 714/22 |
| 7,318,107 | B1 * | 1/2008 | Menon | G06F 11/2025 700/82 |
| 7,647,522 | B2 * | 1/2010 | Meijer | H04L 41/22 714/3 |
| 7,657,657 | B2 * | 2/2010 | Rao | H04L 67/1034 709/248 |
| 7,917,475 | B2 * | 3/2011 | D'Souza | G06F 16/252 707/656 |

(Continued)

*Primary Examiner* — Bai D Vu
(74) *Attorney, Agent, or Firm* — Knobbe, Martens, Olson & Bear, LLP

(57) ABSTRACT

Generally described, one or more aspects of the present application correspond to techniques for automatic recovery from dual isolation in which both the primary and secondary replicas of a volume are stored on isolating servers. The disclosed techniques use handshakes between the client and the replicas to determine which has a better health score. The replica with the better health score becomes the primary replica, and confirms that it and the secondary replica are both in an isolating state. In response, the primary replica seeks a solo blessing, undoes the isolating state at the volume level (the server host will still be in isolating state), and continues handling I/O and peer replication until its healthy peer is complete. These techniques can avoid availability drops when the servers hosting the primary and secondary replicas of a volume enter the isolating state at around the same time.

20 Claims, 6 Drawing Sheets

(56) References Cited

U.S. PATENT DOCUMENTS

| | | | | |
|---|---|---|---|---|
| 2004/0255186 | A1* | 12/2004 | Lau | G06F 11/20 |
| | | | | 714/6.12 |
| 2005/0097394 | A1* | 5/2005 | Wang | G06F 11/203 |
| | | | | 714/11 |
| 2011/0055622 | A1* | 3/2011 | Arai | H04L 45/00 |
| | | | | 714/4.2 |
| 2013/0304805 | A1* | 11/2013 | Arai | H04L 45/60 |
| | | | | 709/203 |
| 2013/0305085 | A1* | 11/2013 | Ocko | H04L 67/327 |
| | | | | 714/4.11 |
| 2014/0379645 | A1* | 12/2014 | Wickremesinghe | G06F 11/203 |
| | | | | 707/624 |

* cited by examiner

US 11,010,266 B1

DUAL ISOLATION RECOVERY FOR PRIMARY-SECONDARY SERVER ARCHITECTURES

BACKGROUND

Cloud computing, in general, is an approach to providing access to information technology resources through services, such as Web services, where the hardware and/or software used to support those services is dynamically scalable to meet the needs of the services at any given time. In order to maintain data availability even in the event of hardware failure, data is often replicated across multiple servers. Further, in order to sustain a healthy server fleet, servers can be isolated (e.g., cut off from network communication with other components) after detection of critical server-level errors, in order to prevent problems from propagating to other servers in the fleet. Typically, if the hardware storing one replica of data enters this isolated state, reads and writes to the data (input/output operations, or "I/O operations"), will failover to another replica, such that there is little or no interruption in access to the data.

DETAILED DESCRIPTION

Figure 1:
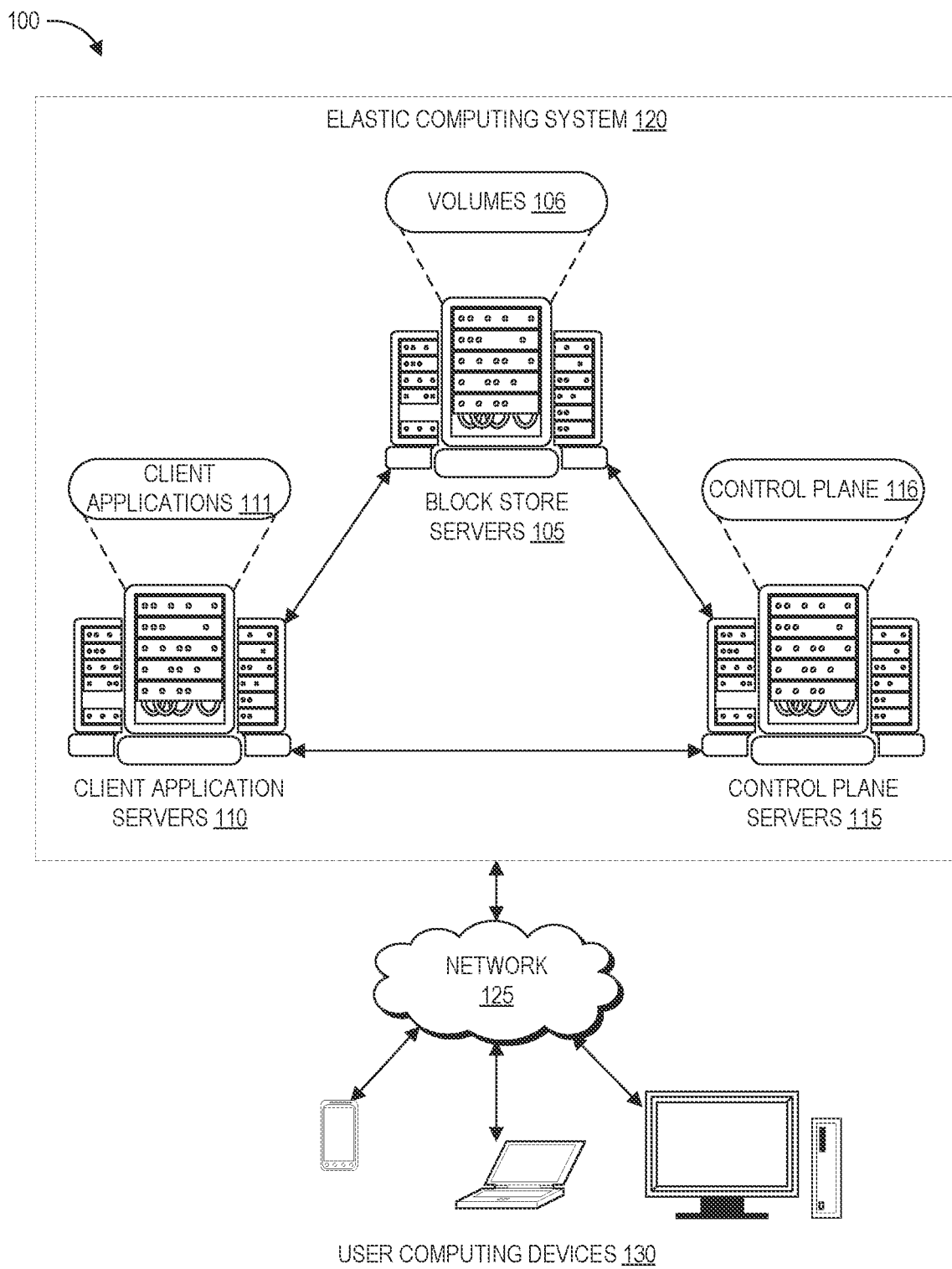
FIG. 1 depicts a schematic diagram of an elastic computing system in which various embodiments according to the present disclosure can be implemented.

Generally described, the present disclosure relates to providing the ability to continue handling I/O operations to a particular volume of data even when each replica of that volume is stored on hardware in an isolating state. As described above, when the hardware storing a volume of data experiences a critical error (e.g., a disc error, a memory error), it enters an isolating state that prevents network communication with other resources in the computing system. A given server may store replicas of multiple different volumes. If a single sector on a single disc of the server fails, the entire server can enter an isolated state by isolating partitions one by one and refusing to function as either primary or secondary for any of the isolated partitions. As described more below, volumes may be partitioned a number of times, for example up to 16. As such, isolation of a volume does not necessarily mean that there is a problem with the entire volume, or even with any part of the volume. Rather, it reflects that there is an error in some part of the server that stores the volume partitions, among possibly many others.

When a primary replica (e.g., the replica that handles I/O to the volume) is stored on an isolating server, the primary replica can close the connection to the client application that manages the I/O. The client can failover to a secondary replica that has been synchronously (or asynchronously) updated to reflect any writes to the primary replica, such that I/O to the volume can continue. The secondary can become the new primary and a new secondary replica can be created from the new primary. However, there are circumstances in which both the server storing the primary replica and the server storing the secondary replica can both enter into the isolating state at nearly the same time. When this occurs, the primary server can sever its client connection and neither server can accept requests for new client connections or mirror connections (e.g., connections that replicate the volume data to a new replica). As a result, the client can perpetually flip back and forth trying to connect to the primary and the secondary. This can result in interruptions in I/O to the volume until manual operator intervention, which may take hours in some circumstances.

The aforementioned problems, among others, are addressed in some embodiments by the disclosed techniques for dual isolation recovery. The disclosed dual isolation recovery allows for automated handling of continued I/O even when the servers storing the primary replica and the secondary replica are both in an isolating state. Specifically, the client can use server health scores to failover to whichever replica is healthier (e.g., experiencing the less critical error or errors). This healthier replica becomes the primary replica, which can confirm that the secondary replica is also in the isolating state before seeking permission to handle I/O without a peer. This can be beneficial because if the secondary replica is not isolating, but is temporarily not responding (for example due to network connection issues), then once the problem with the secondary resolves it should be able to continue handling I/O and new peer replication while the primary fully isolates. However, if the primary can confirm that the secondary is also isolating, the primary can sever its mirror connection to the secondary and request a solo blessing that allows the primary to continue handling I/O without a peer. A blessing refers to permission granted by another entity within the computing system to handle I/O, and may typically be granted in a dual-replica scenario to ensure that any writes to the data are made in multiple locations for data redundancy. Accordingly, a replica may typically seek a dual blessing if there is a mirror connection established with its peer, and may seek a solo blessing only in circumstances such as dual isolation where it is desirable to continue supporting I/O with a single replica. After receiving the solo blessing, the primary replica can unmark the isolating state at the volume level, continue handling I/O, and support replication of a new peer on healthier hardware. During this process, the server storing the primary replica can still be in the isolating state. Thus, once the new peer is created it can assume the role of primary replica, and the former primary can re-enter the isolating state.

As would be appreciated by one of skill in the art, the automated dual isolation recovery techniques, as disclosed herein, represent a significant technological advance over prior implementations. Specifically, the disclosed techniques promote the goals of increased availability of the volume and increased reliability of the volume. Regarding availability, dual isolation will no longer cause an availability drop when dual isolation recovery is implemented if one of the servers is healthy enough to handle I/O, as manual intervention is not required to provide continued availability to the volume. Regarding reliability, dual isolation will no longer lead to volume loss when dual isolation recovery is implemented if one of the servers is healthy enough to support replication of a new peer. Further, the disclosed techniques still promote the server fleet health goals of allowing servers to isolate, even while providing the uninterrupted data access and replication, by undoing the isolating state at the volume level and providing for solo blessings. As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting. For example, although the dual isolation recovery techniques are described in the example context of a primary with one secondary, these techniques can be applied similarly to replication schemes where a primary has multiple secondaries, where the primary and all secondaries are stored on isolating servers. In addition, although described in the context of an elastic computing system, the disclosed dual isolation recovery techniques can be implemented in other suitable data-hosting networked computing environments.

Overview of Example Systems and Techniques for Dual Isolation Recovery

FIG. 1 depicts an example computing environment 100 including an elastic computing system 120 in which the disclosed dual isolation recovery can be implemented. The elastic computing system 120 can be accessed by user devices 130 over a network 125. The elastic computing system 120 includes one or more block store servers 105, one or more client servers 110, and one or more control plane servers 115 that are in networked communication with one another and with the network 125 to provide users with on-demand access to computing resources including volumes 106, described in further detail below. Some implementations of the elastic computing system 120 can additionally include elastic compute servers providing computing resources (referred to as "instances"), domain name services ("DNS") servers, object storage servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The elastic computing system 120 can provide on-demand, scalable computing platforms to users through the network 125, for example allowing users to have at their disposal scalable instances, such as "virtual computing devices" via their use of the block store servers 105. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output (e.g., keyboard, display, and mouse). Users can connect to their virtual computing device using a secure shell (SSH) application, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The elastic computing system 120 can communicate over network 125 with user devices 130. The network 125 can include any appropriate network, including an intranet, the Internet, a cellular network, a local area network or any other such network or combination thereof. In the illustrated embodiment, the network 125 is the Internet. Protocols and components for communicating via the Internet or any of the other aforementioned types of communication networks are known to those skilled in the art of computer communications and thus, need not be described in more detail herein.

User computing devices 130 can include any network-equipped computing device, for example desktop computers, laptops, smartphones, tablets, e-readers, gaming consoles, and the like. Users can access the elastic computing system 120 via their computing devices 130, over the network 125, to view or manage their data and computing resources, as well as to use websites and/or applications hosted by the elastic computing system 120.

Turning specifically to the roles of the different servers within the elastic computing system 120, the block store servers 105 provide persistent data storage in the form of block representations of volumes 106. The block store servers 105 include one or more servers on which data is stored in as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. The block store servers 105 are configured to mirror the content of block devices between servers 105 and synchronously replicate data across redundant servers. For example, the block store servers 105 can have built-in redundancy for volumes by replicating the volume across multiple servers within an availability zone (e.g., a primary replica and a synchronous secondary replica), which means that volumes will not fail if an individual drive fails or some other single failure occurs. The primary and secondary replicas can support user reads and writes (input/output operations, or "I/O operations"), and thus the block store servers 105 can be accessible to the user computing devices 130 over the network 125.

Block representations of volumes 106, which can be treated as an individual hard drive ranging for example from 1 GB to 1 terabyte TB in size, are made of one or more blocks stored on the block store servers 105. Although treated as an individual hard drive, it will be appreciated that the hardware storing a volume may not actually be a hard drive, but instead may be one or more virtualized devices implemented on one or more underlying physical host devices. Volumes may be partitioned a number of times (e.g., up to 16) with each partition hosted by a device of the elastic computing system 120. As described in further detail with reference to FIG. 2, these volumes 106 can be replicated using a primary-secondary architecture to provide for data redundancy. Different subsets of the block store servers 105 can store these replicas to decrease the risk that failure of an individual host (e.g., server) will result in loss of volume data. Thus, volumes may be partitioned, with different partitions stored on different servers, and each partition may have a replica stored on another server. As such, the disclosed dual-isolation can occur at the partition level of a volume (e.g., one partition and its replica may be stored on isolating servers, while other partitions may not be stored on isolating servers). As used herein, an "isolating volume" or "volume marked with an isolating state" thus refers to both an entire un-partitioned volume stored on an isolating server, and a partition of a volume stored on an isolating server.

The elastic computing system 120 can be provided across a number of geographically separate regions, for example to provide users with lower latencies by having their virtual computing devices in or near their geographic location. Each region is physically isolated from and independent of every other region in terms of location and power supply, and may communicate data with the other regions through the network 125. In an example embodiment, a region can include two or more availability zones each backed by one or more physical data centers provided with redundant and separate power, networking and connectivity to reduce the likelihood of two zones failing simultaneously. While a single availability zone can span multiple data centers, in an embodiment, no two availability zones share a data center. This can protect users from data-center level failures by replicating the volumes 106 across availability zones. A data center refers to a physical building or enclosure that houses and provides power and cooling to one or more of the block store servers 105, client servers 110, and control plane servers 115. In an embodiment where the service provider uses availability zones, data centers within an availability zone and the availability zones within a region can be connected to one another through private, low-latency links, for example fiber optic network cables. This compartmentalization and geographic distribution of computing hardware enables the elastic computing system 120 to provide fast service to users on a global scale with a high degree of fault tolerance and stability. To distribute resources evenly across the zones in a given region, the provider of the elastic computing system 120 may independently map availability zones to identifiers for each user account.

The client servers 110 host client applications 111 that manage I/O to individual ones of the volumes 106. The client application 111 can represent the software that performs reads and writes to a block store to transform it into a virtual hard drive for a user or processing instance. The client application 111 can establish communications with the primary replica of a volume in order to read data from the volume and perform writes to the data of the volume. The client application 111 can also perform failover operations to access volume data from a secondary replica when the primary replica is unavailable.

The control plane servers 115 host the control plane 116. The control plane 116 is a logical construct that can be implemented by at least one server 115 with computer-executable software for coordinating system and user requests and propagating them to the appropriate servers in the elastic computing system 120. Functions of the control plane 116 can include, for example, replication of data, failover operations, and receiving requests from users for specific actions to be performed with respect to their hosted virtual computing devices, including creating and cloning volumes, and attaching volumes to computing instances.

Figure 2:
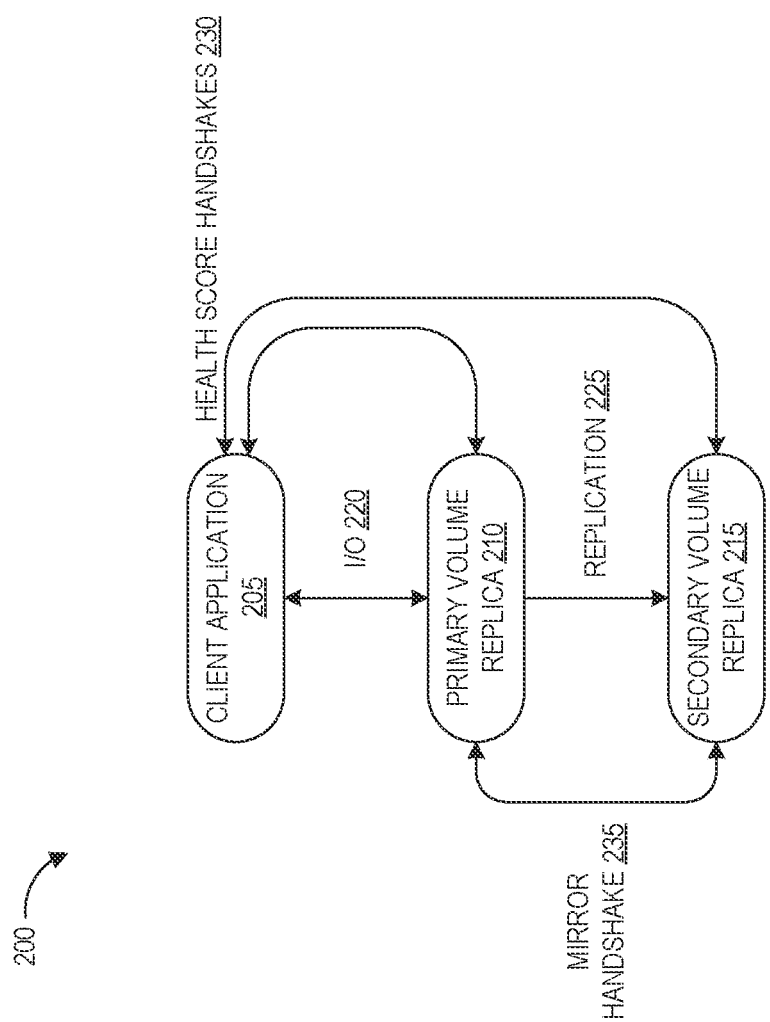
FIG. 2 depicts a schematic diagram of replicated data instances and client communications within the elastic computing system of FIG. 1, according to the present disclosure.

FIG. 2 depicts a schematic diagram of replicated data instances 210, 215 and client communications within the elastic computing system 120 that can implement the disclosed dual isolation recovery techniques. The data instances 210, 215 can be block representations of volumes stored on the block store servers 105. FIG. 2 illustrates a primary volume replica 210 that is connected to a client application 205 to support I/O 220, and also has a mirror connection to a secondary volume replica 215 to support replication 225. Replication 225 refers to actively replicating data off of the primary volume replica 210 so that the secondary volume replica 215 reflects any writes made to the primary volume replica 210 with the I/O. This can be done synchronously in some implementations. This can enable the secondary volume replica 215 to seamlessly take over as the new primary in case the primary volume replica 210 fails. Although FIG. 2 depicts only a single secondary replica, other implementations can have two or more secondaries that replicate off of the primary volume replica 210.

The replicas can implement various communications protocols to establish which replica is the primary at a given point in time. For example, the client application 205 can perform health score handshakes 230 with the replicas to determine which replica is stored on "healthier" hardware (e.g., hardware with the least severe memory, processing, and/or networking problems). This replica stored on the healthiest hardware can assume the role of the primary by accepting the connection with the client. Thus, the roles of primary and secondary replicas may not be fixed, but rather dynamic based on changing hardware and networking conditions.

Each server may compute its own health score periodically or in response to health score handshakes 230 from the client. A health score handshake 230, as described in more detail below, can involve the client application 205 passing the current healthiest health score of the replica set to the replica with which it is communicating, the server determining whether its own score is better or worse than this score, and then accepting the connection request if its score is better than (or equal to) this score, otherwise rejecting the connection request while passing along its own health score. In some implementations, the healthiest score may be 0, reflecting no problems with the hardware. This may be considered as a "baseline" health score, as a properly functioning server would generally have a health score of 0. In such implementations, lower health score values reflect better health, while higher health score values reflect lower health. Different problems can cause this health score to increase up to some maximum value, for example 255 (or higher or lower in various implementations). More critical errors can cause a greater increase than less critical errors. For example, disc errors may cause a greater increase in the health score than high bandwidth usage.

Other implementations may have a baseline health score set to some maximum value, and may detract from this value based on type and severity of error or problem. In such implementations, higher health score values reflect better health, while lower health score values reflect lower health. Even when neither server is operating in the isolating state, the health score handshake 230 can allow the client application 205 to actively failover to the volume replica stored on the healthiest server.

As described above, when certain critical errors are discovered on the hardware storing a replica, the hardware can enter into the isolating state in order to mitigate the risk that these problems can affect other computing resources within the elastic computing system 120. When the hardware storing a replica enters the isolating state, it can also mark any replicas stored thereon with a flag indicating that it is also in the isolating state. A volume in the isolating state may not be able to accept client connection requests or mirror requests from other volumes (e.g., requests to establish or continue a mirror connection). However, in the scenario where the hardware storing both the primary volume replica 210 and the secondary volume replica 215 enter the isolating state during the same timeframe, this can cause a drop in availability of the data of the volume due to both the primary volume replica 210 and the secondary volume replica 215 rejecting connection requests from the client application 205.

Accordingly, in order to implement the disclosed dual isolation recovery techniques, the primary volume replica 210 can perform a handshake 235 with the secondary volume replica 215 to confirm that both replicas are marked with the isolating state. This confirmation can prevent the primary volume replica 210 from dropping its mirror connection to the secondary volume replica 215 and going solo to handle I/O if there is a different reason for the secondary volume replica 215 rejection connection requests, for example due to a temporary drop in network connectivity with the server storing the secondary. Once the primary volume replica 210 confirms that both it and the secondary volume replica 215 are in isolating state, it can seek a solo blessing by obtaining permission from the control plane 116 to accept connection requests without a peer. In response to receiving this blessing, the primary volume replica 210 can sever its mirror connection to the secondary volume replica 215 (e.g., the network link for replication 225) and accept the client connection request for I/O 220.

Thereafter, a new healthy peer can be created from the primary volume replica 210 and optional from the secondary volume replica 215 if a portion of the volume data is not recoverable from the primary volume replica 210, for example because it is stored on a disc portion experiencing the error that caused the primary volume server to enter the isolating state. This can be referred to as "zippering," and even in the isolating state the secondary volume replica 215 can respond to zippering requests to read block(s) of its data. This can involve checking its metadata to ensure that the requested blocks are up to date. The primary replica 210 may store information regarding the new peer, the old peer, and the zippering peer. Once the new peer is created, when the client application 205 performs the health score handshake 230 with the new peer it can acknowledge that it has a better health score and accept the client connection request for I/O 220, becoming the new primary. When the primary volume replica 210 learns that it is now the secondary replica, it can re-mark its state as isolating and drop the mirror connection with the new primary. The new primary can then support creation of a new healthy peer. In this manner, the primary volume replica 210 is able to handle continued I/O 220 and support creation of a new healthy replica set for the volume, even while its hardware in the isolating state.

Figure 3:
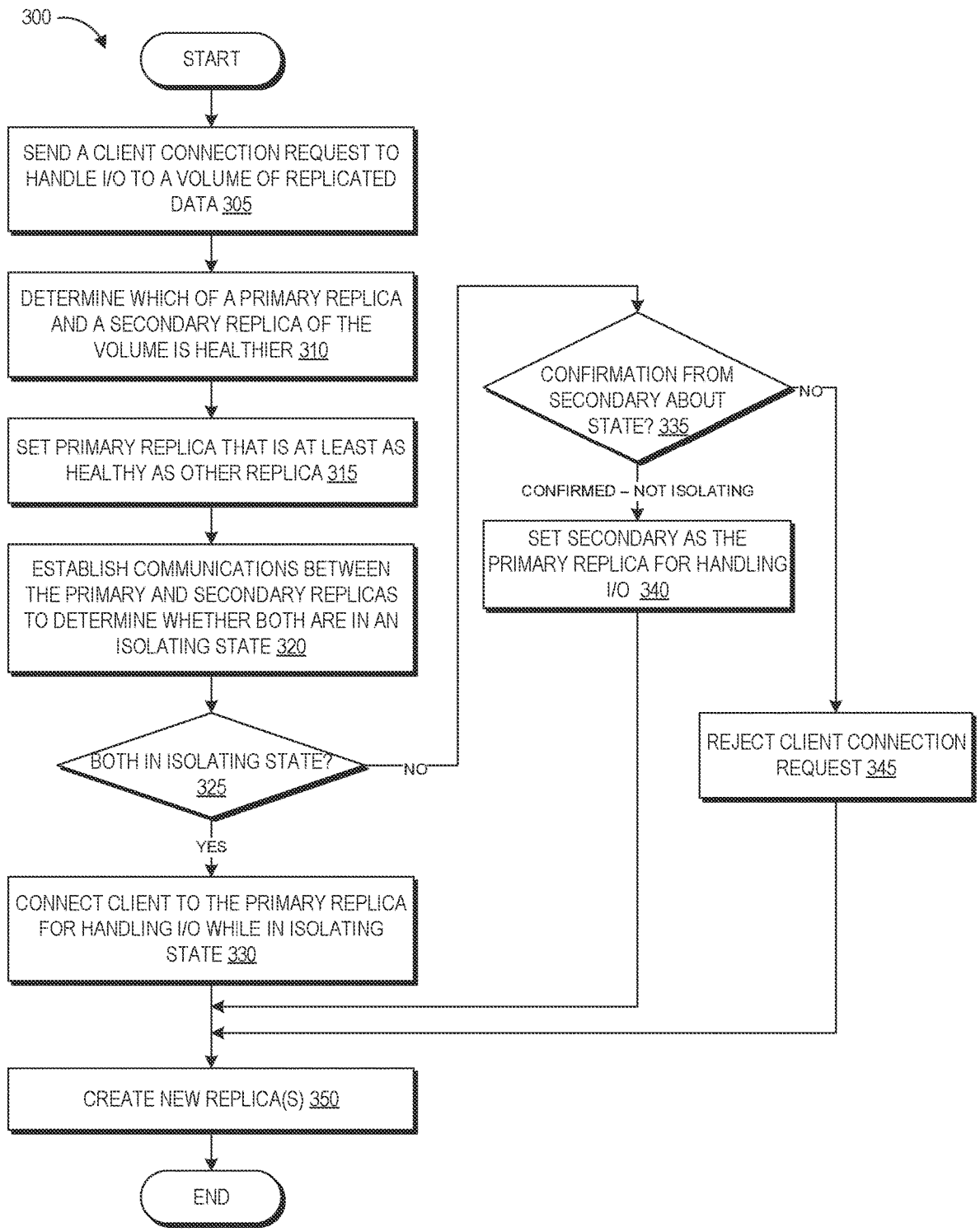
FIG. 3 is a flowchart of an example process for managing client connection with isolating volumes within the elastic computing system of FIG. 1, according to the present disclosure.

FIG. 3 is a flowchart of an example process 300 for managing client connection with isolating volumes within the elastic computing system 120, according to the present disclosure. The process 300 can be performed by the various servers of the elastic computing system 120.

At block 305, the client application 205 can send a connection request to the current or most recent primary replica 210 of a replicated volume of data. As described herein, one or both of the primary replica 210 and the secondary replica 215 can be operating in the isolating state. If only the primary replica 210 is isolating and the secondary replica 215 is not, then the primary replica 210 can begin a handshake with the secondary replica 215 to determine that the secondary replica 215 is not isolating, and the secondary replica 215 can assume the role of primary and connect to the client application 205 for handling I/O. If only the secondary replica 215 is isolating, then the primary replica 210 can determine this during the handshake between primary and secondary, drop its mirror connection to the secondary replica 215, support creation of a new peer, and connect to the client application 205 for handling I/O. The majority of the process 300 described below focuses on the scenario where both the primary replica 210 and the secondary replica 215 are in the isolating state.

If the primary replica of the volume is healthy (e.g., not isolating), it can confirm its mirror connection to the secondary replica and accept the client connection. However, if the primary replica is not healthy (e.g., is isolating or otherwise operating with a degraded health score), it can try to connect to the secondary, and if the secondary is not isolating the primary can disconnect from the secondary and the secondary can accept the client connection request. If both the primary and the secondary are isolating, the process 300 transitions to block 310. At block 310, the system can determine which of the primary and secondary replicas is healthier, for example based on health score handshakes as described in further detail below, or based on another metric of replica health. As described herein, individual servers can compute their health scores based on memory, non-volatile media, processing, and networking performance on the server. Determining which replica has the better health score can involve multiple handshakes between the client and individual ones of the primary and secondary replicas, where each handshake presents a health score and requests the server to determine whether its own health score is better. When the health score of the server is better than (or equal to) the score provided by the client, this is the healthiest replica out of the replica set, and it is set as the primary replica at block 315. Although certain examples discuss this replica as the "healthiest," in some implementations the health scores may be equal, and thus the chosen replica may be at least as healthy as the other replica.

At block 320, before accepting the client connection request, the primary replica 210 initiates an isolating handshake with the secondary replica 215. This can involve the primary replica sending a message to the secondary replica indicating that the "isolating" flag is set to true for the primary replica. In response, the secondary replica 215 also indicate the "isolating" flag is set to true. For example, the secondary replica 215 can reject the connection request from the primary replica with a negative acknowledgement ("NACK") and an error code indicating that the reason for the NACK is that the secondary replica is also flagged in the isolating state.

At decision block 325, the primary replica 210 confirms that both replicas are in the isolating state. If so, at block 330 the primary acknowledges the client connection request for handling the I/O, even though the server storing the primary is in the isolating state. This can involve unmarking the primary replica of the volume with the isolating flag, for example by changing "isolating=true" to "isolating=false". Even though the volume is unmarked, the server can maintain its state of isolation, and can re-mark the replica with this flag once a healthier replica takes over as primary. To this end, at block 350 the primary replica can also create a mirror connection with a new peer and begin the process of providing blocks of data to create the peer.

As described above, there may be scenarios where both replicas are not in isolating state. Accordingly, the process 300 can transition from block 325 to block 335 to determine whether the secondary has confirmed that it is not in isolating state (e.g., by responding to the handshake with the primary with an acknowledgement of the connection or some other suitable indication that its state "isolating=false"). In these circumstances, the process 300 can transition to block 340 to set the secondary as the primary replica for handling I/O, and then to block create a new replica with a mirror connection to this new primary.

If, at block 335, the secondary has not confirmed that it is in isolating state (e.g., if the mirror handshake times out due to network unavailability), the primary replica 210 may reject the client connection request. This is because, without a confirmation that the secondary replica 215 is also in the isolating state, the primary replica 210 does not know whether the secondary has already established a connection with the client application 205 and has begun handling I/O. The client may retry the primary and/or secondary periodically to establish a connection for I/O operations. In some implementations, at block 350 the primary replica 210 may also begin supporting the creation of a new healthy peer, for example initiating a proactive re-mirror to progress the isolation.

It will be appreciated that the client application 205 may not obtain data that would provide an awareness of the isolating states of the primary or secondary. For example, from the perspective of the client application 205 an I/O connection may either be accepted or not, without any indication of whether the primary replica, secondary replica, or both are in the isolating state. Rather, the isolating state is exchanged between the replicas so that the primary can confirm that it needs a solo blessing to provide uninterrupted access to the volume data. Other implementations may provide the isolating state information to the client application 205.

Figure 4A:
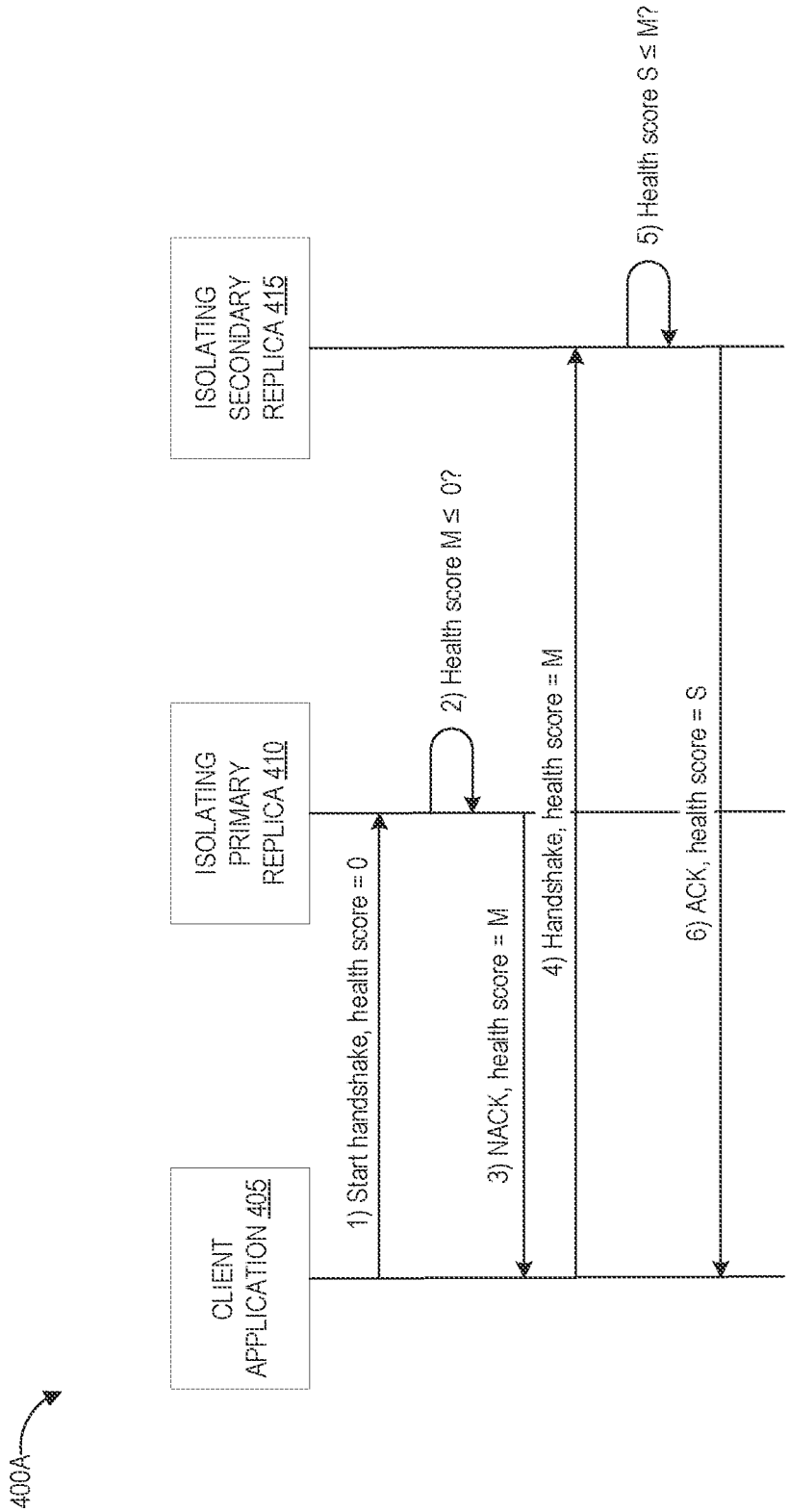
FIG. 4A depicts a schematic diagram of a first health score workflow for determining client connection to a replica within the elastic computing system of FIG. 1.

FIG. 4A depicts a schematic diagram of a first health score workflow 400A for determining client connection to a replica within the elastic computing system of FIG. 1. FIG. 4A depicts example data communications between the client application 405, an isolating primary replica 410, and an isolating secondary replica 415. The isolating primary replica 410 and isolating secondary replica 415 represent replicas of the same volume stored on different subsets of the block store servers 105, with the particular number of servers in each subset corresponding to the number of partitions in the volume in some implementations. The client application 405 can represent the software that performs reads and writes to a block store to transform it into a virtual hard drive for a user or processing instance. The workflow 400A illustrates a series of health score handshakes that determine to use the isolating secondary replica 415 as the primary replica.

As described herein, a replica in the isolating state does not accept client connection requests or mirror requests. However, an isolating replica can still communicate with other computing entities via handshakes. As used herein, a handshake refers to an automated process of negotiation between two computing entities through the exchange of information that establishes the protocols of a communication link at the start of the communication, before full communication (e.g., handling I/O operations) begins. The interactions of FIG. 4A begin at (1), where the client application 405 starts the handshake with the primary replica 410. In this example, the initial handshake at (1) sends a baseline health score of 0. This baseline health score reflects one implementation of a healthiest health score, for example where health scores are computed between 0 and 255 as described above. This baseline can also be the health score most recently passed to the client by the replica set during a previous I/O communication.

At (2), the server storing the primary replica 410 performs a comparison to determine whether its own health score (here, shown as M) exceeds the health score of 0. As described herein, the server storing the primary replica 410 can compute its health score based on its current memory, processing, and/or networking performance. Because the primary replica 410 is in the isolating state, its health score M will exceed the score of 0 and reflect the severity of the error that caused its server to enter the isolating state. Accordingly, at (3) the primary replica 410 responds to the client application 405 with a NACK and an indication of its health score M. Here, NACK refers to a negative acknowledgement of the I/O connection request, or, put another way, a rejection of the connection request.

Because the primary replica responded by rejecting the connection request, the client application 405 at (4) initiates another handshake with the secondary replica 415. The client application 405 can provide the health score M (the health score of the primary replica's server) to the secondary replica 415. At (5), the server storing the secondary replica 415 performs a comparison to determine whether its own health score (here, shown as S) exceeds the health score of M. As described herein, the server storing the secondary replica 415 can compute its health score based on its current memory, processing, and/or networking performance.

Because the server storing the secondary replica 415 is in the isolating state, its health score S will exceed the score of 0 and reflect the severity of the error that caused its server to enter the isolating state. In this example, the health score S of the secondary replica's server is better than the health score M of the primary replica's server. Accordingly, at (6) the secondary replica 415 responds with an acknowledgement ("ACK") to the client application 405 and also provides its own health score S (for use by the client application 405 in future handshakes with replicas of this volume). The ACK response refers to an acceptance of the I/O connection request, and also causes the secondary replica 415 to assume the role of primary and causes the primary replica 410 to assume the role of secondary. Accordingly, the interactions 400A represent one possible option for using pre-I/O-communication health score handshakes to determine to use the secondary replica as the primary replica for purposes of handling this I/O, even though the secondary replica's server is operating in a degraded state.

Figure 4B:
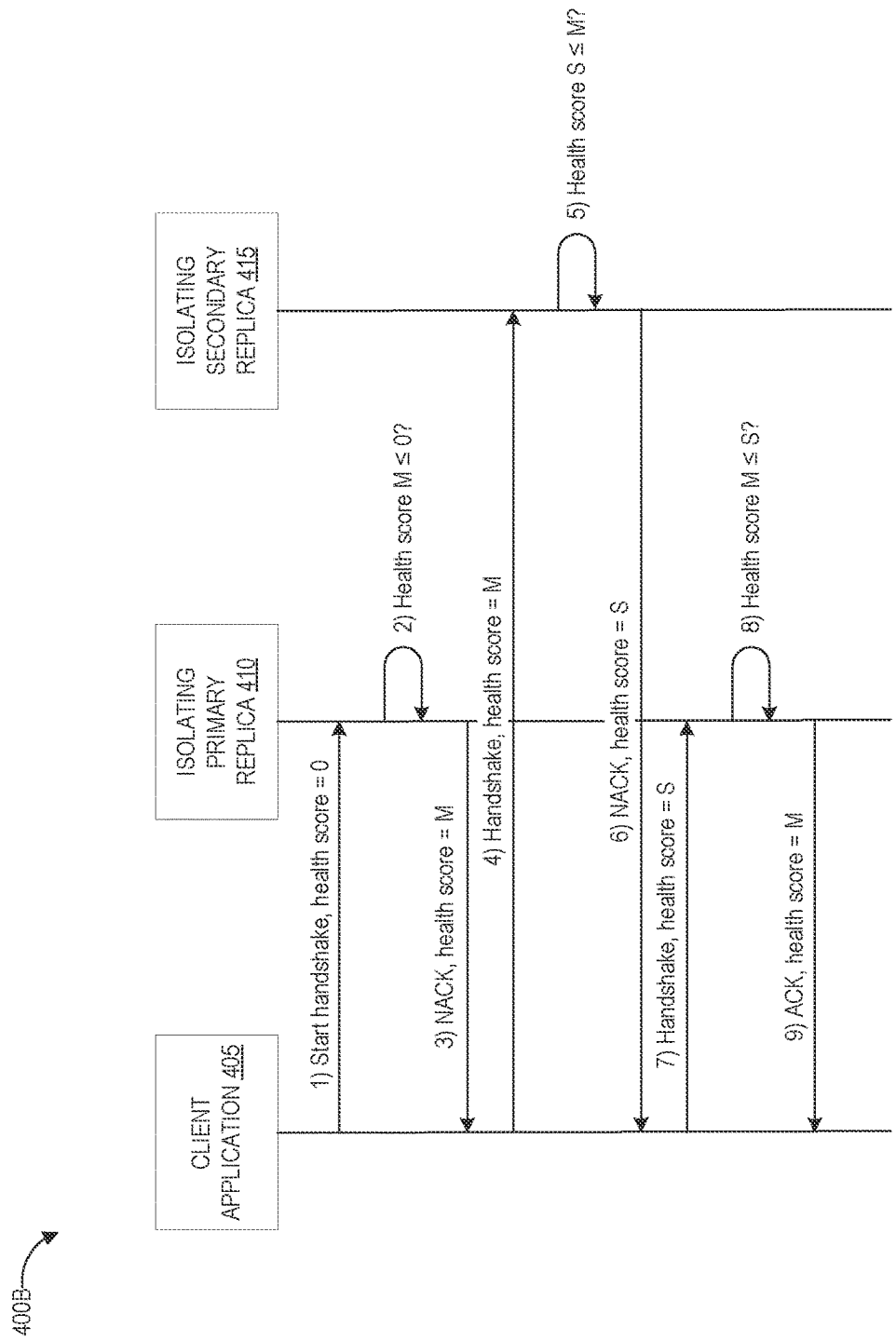
FIG. 4B depicts a schematic diagram of a second health score workflow for determining client connection to a replica within the elastic computing system of FIG. 1.

FIG. 4B depicts a schematic diagram of a second health score workflow 400B for determining client connection to a replica within the elastic computing system of FIG. 1. FIG. 4B also depicts example data communications between the client application 405, the isolating primary replica 410, and the isolating secondary replica 415. The workflow 400B illustrates a series of health score handshakes that determine to continue using the isolating primary replica 410 as the primary replica.

Interactions (1) through (4) operate similarly to those described above, where a first handshake between the client application 405 and primary replica 410 yields a NACK response due to the primary health score M exceeding zero, and the client application 405 sending the primary health score M to the secondary replica in another handshake at interaction (4). However, in this example workflow 400B, at (5) the secondary replica 415 determines that its health score S exceeds the primary health score M. For example, the server storing the secondary replica 415 may be experiencing multiple errors, or a more critical error, than the server storing the primary replica 410. Accordingly, at (6) the secondary replica 415 responds to the client application 405 with a NACK and an indication of its health score S.

Because the client connection request has again been rejected, the client application 405 at interaction (7) initiates another handshake with the primary replica 410, this time providing the most recently received health score S to the primary replica 410. Accordingly, at (8) the primary replica 410 compares its health score M to the health score S of the secondary replica. In this example, the health score M is less than the health score S, so the primary replica 410 sends an ACK response to the client application 405 and also provides its own health score M (for use by the client application 405 in future handshakes with replicas of this volume). The ACK response constitutes an acceptance of the I/O connection request, and also causes the primary replica 410 to continue in its role as primary and causes the secondary replica 415 to continue in its role as secondary. Accordingly, the interactions 400B represent one possible option for using pre-I/O-communication health score handshakes to determine to continue using the primary replica for purposes of handling this I/O, even though the primary replica's server is operating in a degraded state.

It will be noted that the communications back to the client application 405 from the volume replicas include health scores but not indications that the replicas are operating in the isolating state. Accordingly, the client application 405 may not have any awareness that either replica is in the isolating state. Other embodiments may pass this information to the client application 405 during the handshake.

Figure 5:
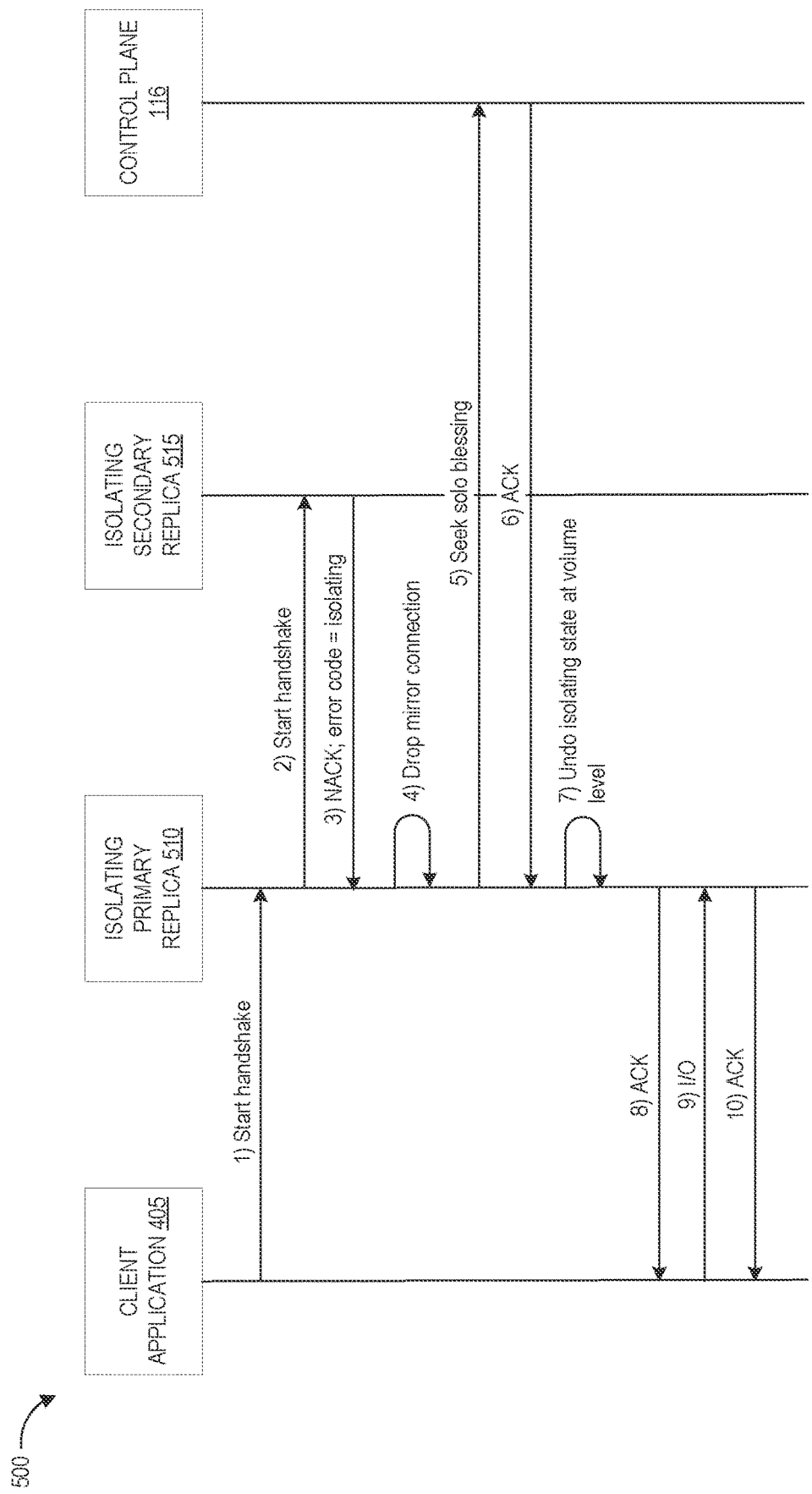
FIG. 5 depicts a workflow for using an isolating volume to handle I/O operations within the elastic computing system of FIG. 1A.

FIG. 5 depicts a workflow 500 for using an isolating volume to handle I/O operations within the elastic computing system 120. FIG. 5 depicts example data communications between the client application 405, an isolating primary replica 510, an isolating secondary replica 515, and the control plane 116. The isolating primary replica 410 and isolating secondary replica 415 represent replicas of the same volume stored on different subsets of the block store servers 105, and can be determined based on the health score handshakes of FIGS. 4A and 4B. The control plane 116 represents a logical construct that manages the flow of requests, data, and control signals through the elastic computing system 120. In this implementation, the control plane 116 also provides permissions or authorizations to volume replicas to handle I/O (referred to as dual blessings for two-replica sets, or solo blessings for a single replica). In some implementations this blessing grant can be performed by another entity within the computing system 120, for example an entity dedicated to blessing management.

The interactions begin at (1), when the client application 405 starts the pre-I/O handshake with the primary replica 510. The workflows 400A, 400B for determining which replica is stored on a healthier server can occur at interaction (1) in order to identify which replica to use as the primary, shown here as primary replica 510. However, the interactions 500 for proceeding with I/O in the dual isolation scenario can still proceed without the use of the health score interactions 400A, 400B. The health score can be used to allow the healthier of the two replicas to go solo. Without it, the interactions 500 can be implemented but without a mechanism to ensure that the healthier of the two replicas will go solo. The primary replica 510 knows that it is in isolating state, so before proceeding to send the ACK to the client application 405 the primary replica 510 at interaction (2) can initiate a mirror handshake with the secondary replica 505. In some implementations, this additional handshake can provide the isolating status of the primary replica 510 (isolating=true) to the secondary replica 515, however it may not be necessary for the primary replica 510 to provide its state to the secondary replica 515.

In response, at (3) the secondary replica 515 can send a NACK response to the primary replica 515 rejecting the mirror connection request represented by the handshake, as replicas operating in the isolating state cannot accept mirror connections. Further, the secondary replica 515 can provide an error code indicating that its status is also isolating. This handshake protocol enables the primary replica 510 to confirm that the secondary replica 515 is also operating in the isolating state.

At (4), the primary replica 510 can drop the mirror connection to the secondary replica 515 in response to confirming that the secondary replica is in the isolating state. At (5), the primary replica 510 can seek a solo blessing from the control plane 116, which represents permission for the primary replica to handle the I/O operations without a peer. This request may include information identifying that the primary replica has determined that the secondary replica is isolating. At (6), the control plane 116 can respond by acknowledging the request, which grants permission to the primary replica 510 to handle the I/O operations without its peer.

At (7), the primary replica 510 can undo the isolating marking at the volume level. This can enable the primary replica 510 to accept client connection requests and also to establish a mirror connection for creating a new peer. Even though the data store of the primary replica is no longer marked with the isolating state, the server storing this replica is still in the isolating state (as well as other volumes stored on the server, in multi-tenant implementations).

At (8), the primary replica 510 sends an acknowledgement ACK back to the client application 405 to accept the client connection. This interaction represents interaction (6) of the workflow 400A, and interaction (9) in the workflow 400B. Thereafter, at (9) the primary replica 510 supports the I/O operations to the volume data, and at (10) acknowledges to the client application 405 that any writes have been performed.

Although not illustrated, after interaction (7) the primary replica 510 can also establish a new mirror connection and begin supporting creation of a new healthier peer. Once this peer is created, the client application 405 may reach out to it via a health score handshake and determine that the new replica is stored on a healthier server than the primary replica 510. As such, the new replica can assume the role of primary, and the server storing the previous primary replica 510 can re-mark it with the isolating state. When the new primary performs the mirror handshake it can determine that the previous primary is in isolating state, drop the mirror connection, and begin creation of an additional new replica. As such, the disclosed dual isolation recovery techniques facilitate automated handling of I/O using a replica operating in isolating state, as well as creation of a new healthy replica set for the volume.

With respect to re-marking the primary replica 510 with the isolating state, a server may implement an isolation workflow in response to the detection of an error. This isolation workflow can go through the volumes or volume partitions stored on the server and mark each with the "isolating" state, subject to certain safety checks, until all volumes are confirmed to be in the isolating state. When all volumes are marked with "isolating" then the server can update its state from "isolating" to "isolated." The safety check of the isolation workflow can determine whether a given replica is mirrored to a peer, in order to avoid isolating solo (unmirrored) replicas. Returning to the interactions 500, when the primary replica 510 unmarks the "isolating" state at (7) it has already dropped its mirror connection at (4).

Accordingly, when the server's isolation workflow returns to this volume, the safety check would prevent it from again being marked as isolating due to not having a mirror connection to a peer. Once the new peer is completed and the mirror connection is established between the new peer and the primary replica 510, the server's isolation workflow can again mark the primary replica 510 as "isolating," which can sever the mirror connection, which in turn can cause the new peer to create another new peer.

The disclosed techniques can be extended to implementations having more than two replicas of a volume (or other format of data store). For example, the workflow 400B can be modified to have the client application 405 reach out to another replica at interaction (7) instead of reaching back to the primary replica. In addition, the isolating handshake performed at interactions (2) and (3) of the workflow 500 can be repeated for each replica of the volume to ensure that all of the replicas are in isolating state before the primary replica requests the solo blessing.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes may begin in response to an event, such as on a predetermined or dynamically determined schedule, on demand when initiated by a user or system administer, or in response to some other event. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computing system, comprising:
    a first server configured to store a first replica of a block representation of a volume, the first replica acting as a primary replica for the volume, wherein the first server is configured to operate in an isolating state responsive to detection of an error on the first server, and wherein the first server is configured to mark the first replica with the isolating state, wherein the first replica, when marked with the isolating state, is configured to not accept client application connections or mirror connections;
    a second server configured to store a second replica of the block representation of the volume, the second replica acting as a secondary replica for the volume, wherein the second server is also configured to operate in the isolating state responsive to detection of an error on the second server, wherein the second server is configured to mark the second replica with the isolating state, and wherein the second replica, when marked with the isolating state, is configured to not accept client application connections or mirror connections; and
    a client application implemented by one or more processors coupled to one or more memories, the memories including computer-executable instructions that, upon execution, cause the client application to manage input and output operations (I/O operations) to the volume;
    wherein the first server is configured to confirm that both the primary replica and the secondary replica are marked with the isolating state, unmark the isolating state of the primary replica, and connect the primary replica to the client application to support the I/O operations to the volume.

2. The computing system of claim 1, wherein the first server is configured to seek permission to use the primary replica to handle the I/O operations without a peer after confirming that both the primary replica and the secondary replica are marked with the isolating state, and, responsive to receiving the permission, drop a mirror connection between the primary replica and the secondary replica.

3. The computing system of claim 1, wherein the first server continues to operate in the isolating state while the first replica is connected to the client application, the computing system further comprising:
    a third server having stored thereon a third replica of the block representation of the volume copied at least in part from the first replica while the first server is configured to operate in the isolating state; and
    wherein, upon completion of the third replica:
        the third server is configured to connect the third replica to the client application to support the I/O operations to the volume whereby the third replica becomes the primary replica and supports creation of a fourth replica, and
        the first server is configured to re-mark the first replica with the isolating state.

4. A computer-implemented method, comprising:
    providing a first replica of a volume of data stored on a first server and a second replica of the volume of data stored on a second server, wherein the first replica has a mirror connection to the second replica;
    confirming that both the first replica and the second replica are marked with an isolating state, wherein the first replica is marked with the isolating state responsive to detection of an error on the first server storing the first replica, wherein the second replica is marked with the isolating state responsive to detection of an error on the second server storing the second replica, and wherein each of the first and second replicas cannot accept client application connections or mirror connections when marked with the isolating state;
    unmarking the isolating state of the first replica responsive to said confirming; and
    connecting the first replica to a client application that manages input and output operations (I/O operations) to the volume.

5. The computer-implemented method of claim 4, further comprising:
    requesting permission for the first replica to support the I/O operations without a peer responsive to said confirming; and
    responsive to receiving the permission, dropping the mirror connection between the first replica and the second replica.

6. The computer-implemented method of claim 5, further comprising:
    creating a new replica of the volume at least in part by copying the data of the volume from the first replica; and
    establishing the mirror connection between the first replica and the new replica.

7. The computer-implemented method of claim 6, further comprising:
    determining that a portion of the data of the volume cannot be retrieved from the first server storing the first replica due to error; and
    retrieving the portion of the data from the second server storing the second replica.

8. The computer-implemented method of claim 6, further comprising, upon completion of the new replica:
    connecting the new replica to the client application to support the I/O operations to the volume; and
    re-marking the first replica with the isolating state.

9. The computer-implemented method of claim 6, further comprising, upon completion of the new replica:
    dropping the mirror connection between the first replica and the new replica;

creating an additional new replica of the volume at least in part by copying the data of the volume from the new replica; and establishing the mirror connection between the new replica and the additional new replica.

10. The computer-implemented method of claim 4, wherein the first replica is a primary replica and the second replica is a secondary replica, the computer-implemented method further comprising:

performing a first handshake between the client application and the first replica to determine that a health score of the first server is worse than a baseline health score, wherein the health score of the first server is computed based at least partly on performance of memory and non-volatile media of the first server;

performing a second handshake between the client application and the second replica to determine that a health score of the second server is worse than the health score of the first server, wherein the health score of the second server is computed based at least partly on performance of memory and non-volatile media of the second server; and performing a third handshake between the client application and the first replica to determine that the health score of the first server is better than the health score of the second server.

11. The computer-implemented method of claim 10, further comprising keeping the first replica as the primary replica and the second replica as the secondary replica responsive to performing the third handshake.

12. The computer-implemented method of claim 4, wherein the second replica is a primary replica and the first replica is a secondary replica, the computer-implemented method further comprising:

performing a first handshake between the client application and the second replica to determine that a health score of the second server is worse than a baseline health score, wherein the health score of the second server is computed based at least partly on performance of memory and non-volatile media of the second server; and performing a second handshake between the client application and the first replica to determine that a health score of the first server is better than the health score of the second server, wherein the health score of the first server is computed based at least partly on performance of memory and non-volatile media of the first server.

13. The computer-implemented method of claim 12, further comprising switching the first replica to the primary replica and the second replica to the secondary replica responsive to performing the second handshake.

14. The computer-implemented method of claim 12, further comprising computing health scores locally on respective servers.

15. The computer-implemented method of claim 4, wherein the first server is also marked with the isolating state responsive to detection of the error on the first server, and wherein the method further comprises performing a write to the data while the first replica is unmarked with the isolating state and while the first server is marked with the isolating state.

16. Non-transitory computer-readable media comprising computer-executable instructions that, when executed on a computing system, cause the computing system to perform operations comprising:

providing a first replica of data on a first server, wherein the first replica has a mirror connection with a second replica of the data stored on a second server;

confirming that the first replica and the second replica are both marked with an isolating state, wherein the first replica is marked with the isolating state responsive to detection of an error on the first server storing the first replica, wherein the second replica is marked with the isolating state responsive to detection of an error on the second server storing the second replica, and wherein each of the first and second replicas, when marked with the isolating state, cannot accept client application connections; and responsive to said confirming, unmarking the first replica with the isolating state and connecting the first replica to the client application to handle input and output operations (I/O operations).

17. The non-transitory computer-readable media of claim 16, the operations further comprising:

requesting permission for the first replica to support the I/O operations without a peer responsive to said confirming; and responsive to receiving the permission, dropping the mirror connection between the first replica and the second replica.

18. The non-transitory computer-readable media of claim 16, the operations further comprising:

creating a third replica of the data at least in part by copying the data from the first replica; and establishing the mirror connection between the first replica and the third replica.

19. The non-transitory computer-readable media of claim 18, the operations further comprising, responsive to the third replica assuming a role of primary replica, re-marking the first replica with the isolating state.

20. The non-transitory computer-readable media of claim 16, wherein the first server is also marked with the isolating state responsive to detection of the error on the first server, and wherein the operations further comprise performing a write to the data while the first replica is unmarked with the isolating state and while the first server is marked with the isolating state.

* * * * *